H. S. WOOD.
Mirror-Attachments.

No. 158,348.  Patented Dec. 29, 1874.

Witnesses
A. P. Grant.
G. S. Hetherington.

Inventor
Henry S. Wood
by
John A. Wiesenheim & Co.
attys.

UNITED STATES PATENT OFFICE

HENRY S. WOOD, OF PHILADELPHIA, PENNSYLVANIA.

IMPROVEMENT IN MIRROR ATTACHMENTS.

Specification forming part of Letters Patent No. 158,348, dated December 29, 1874; application filed March 25, 1874.

CASE A.

*To all whom it may concern:*

Be it known that I, HENRY S. WOOD, of the city and county of Philadelphia and State of Pennsylvania, have invented a new and useful Improvement in Mirror-Reflectors and Toilet-Glasses; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
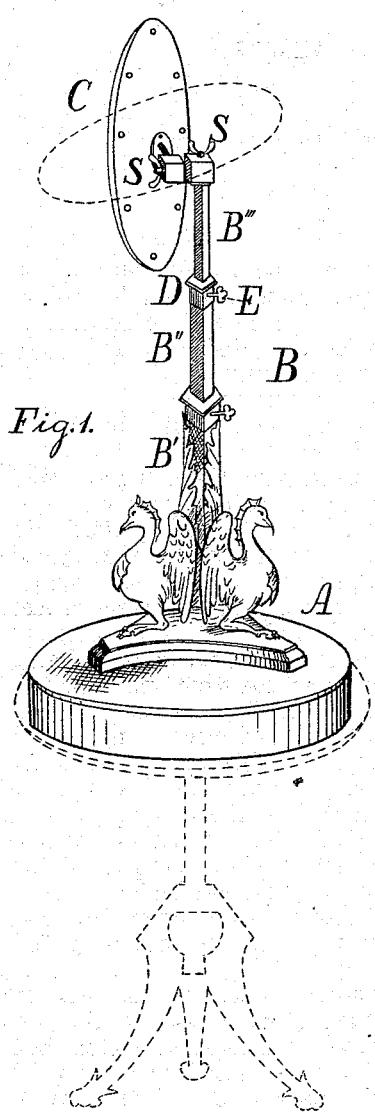
Figure 2:
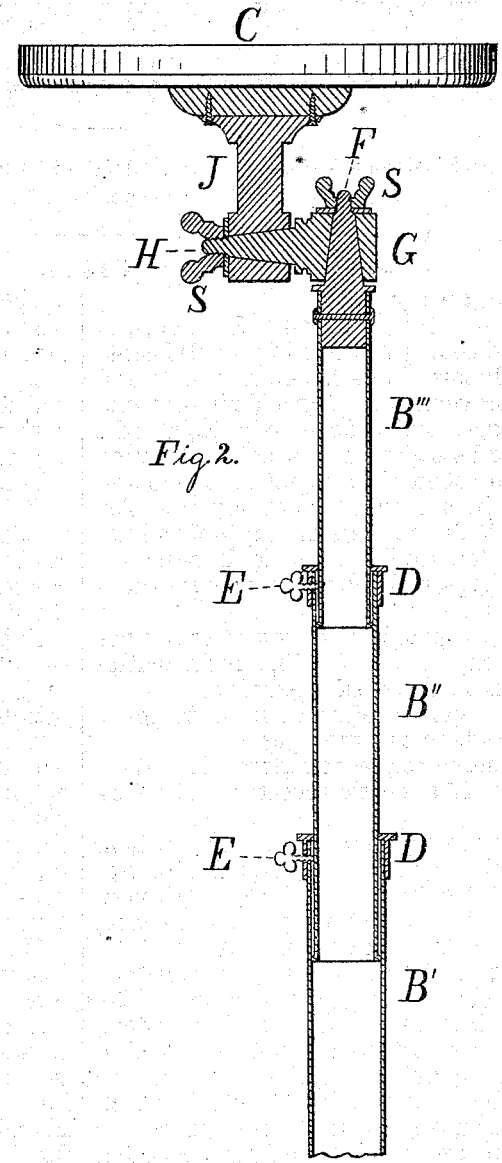

Figure 1 is a perspective view of the device embodying my invention. Fig. 2 is a central vertical section of an enlarged view.

Similar letters of reference indicate corresponding parts in the two figures.

This invention relates to a glass adapted for the purpose of a mirror-reflector and toilet-glass.

My invention consists in the combination, with the tubular stem or standard, of a vertical plug fitted into said stem, a horizontal arm constructed with a plug, and another arm, to which the glass is directly secured.

Referring to the drawings, A represents a base or bottom portion, which supports the device, and from said base there rises a stem, B, which carries the glass C, and is formed in sections consisting of a series of circular or angular hollow tubes, B' B'' B''', fitted to each other telescopically, so that the stem may be distended or drawn out to almost the united lengths of the sections, or reduced to the length of the lower section, whereby the altitude of the glass C may be varied or adjusted. A cap, D, is fitted over the top of each section and encircles the adjacent section, and set-screws E pass through the caps, retaining or fixing the sections when distended. In the upper section is introduced and secured a vertical plug, F, which is jointed to a horizontal arm, G, which has formed with or secured to it a plug, H, which is jointed to an arm, J, to which the glass C is secured. These jointed parts permit the glass to be moved to various angles, and they are held in place by thumb screws or nuts S.

It will be noticed that there is great simplicity in the manner of attaching the plug F to the top section, said plug being fitted into the said top tubular section, and a rivet passed through the same firmly connects the parts.

The tubular structure of the stem causes the stem to bear firmly the strain therein, said strain being caused by the glass C being attached to the top of the stem out of center.

The stand may be readily lifted and handled, and carried to any part of a room and placed on the floor, or on a table, bureau, or other piece of furniture, so that the glass can be used as an ordinary toilet-glass; or, by locating the device relatively to the main mirror and imparting the proper angle to the glass C, the latter will serve as a mirror-reflector.

Having thus described my invention, what I claim as new, and desire to secure by Letters Patent, is—

The combination, with the tubular stem or standard B of the looking-glass C, of the vertical plug F, fitted in said tubular stem, the horizontal arm G, constructed with the plug H and fitted on the arm F, and the arm J, fitted on the plug H and rigidly secured to the glass, all arranged and operating as set forth.

HENRY S. WOOD.

Witnesses:
JOHN A. WIEDERSHEIM,
G. S. HETHERINGTON.